H. S. FARQUHAR.
MACHINE FOR REMOVING SNOW AND LIKE MATERIAL.
APPLICATION FILED OCT. 28, 1916.
1,272,786.
Patented July 16, 1918.
8 SHEETS—SHEET 1.
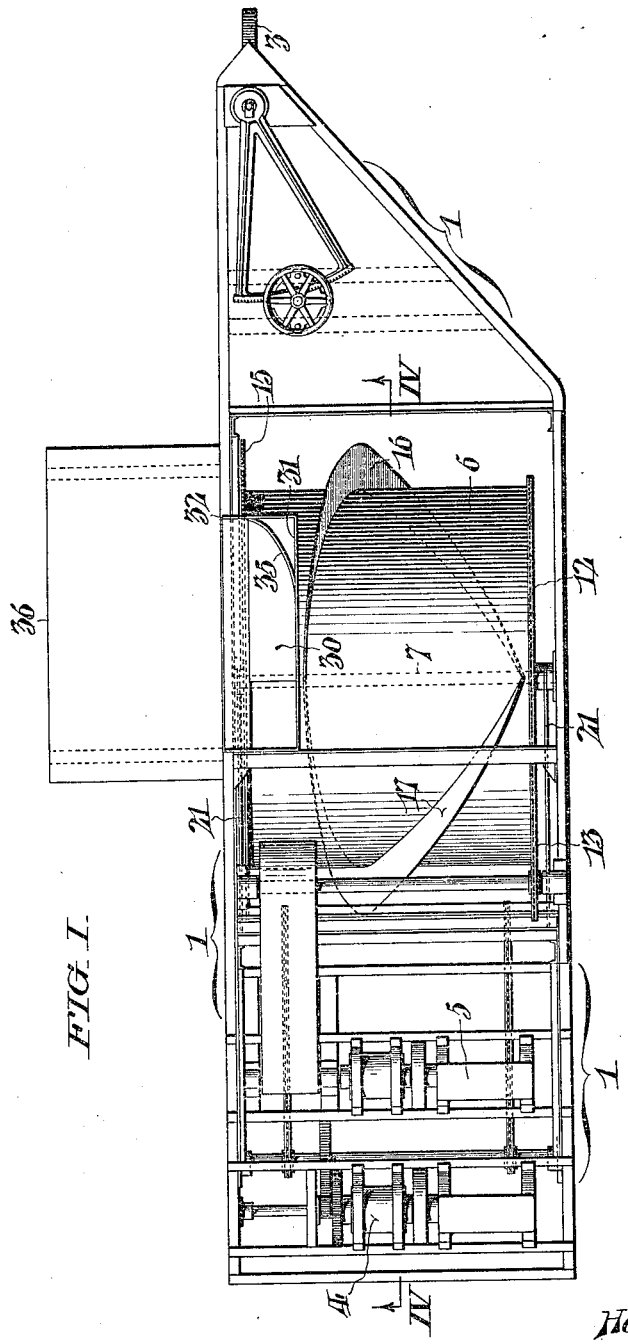
Inventor
Henry S. Farquhar,

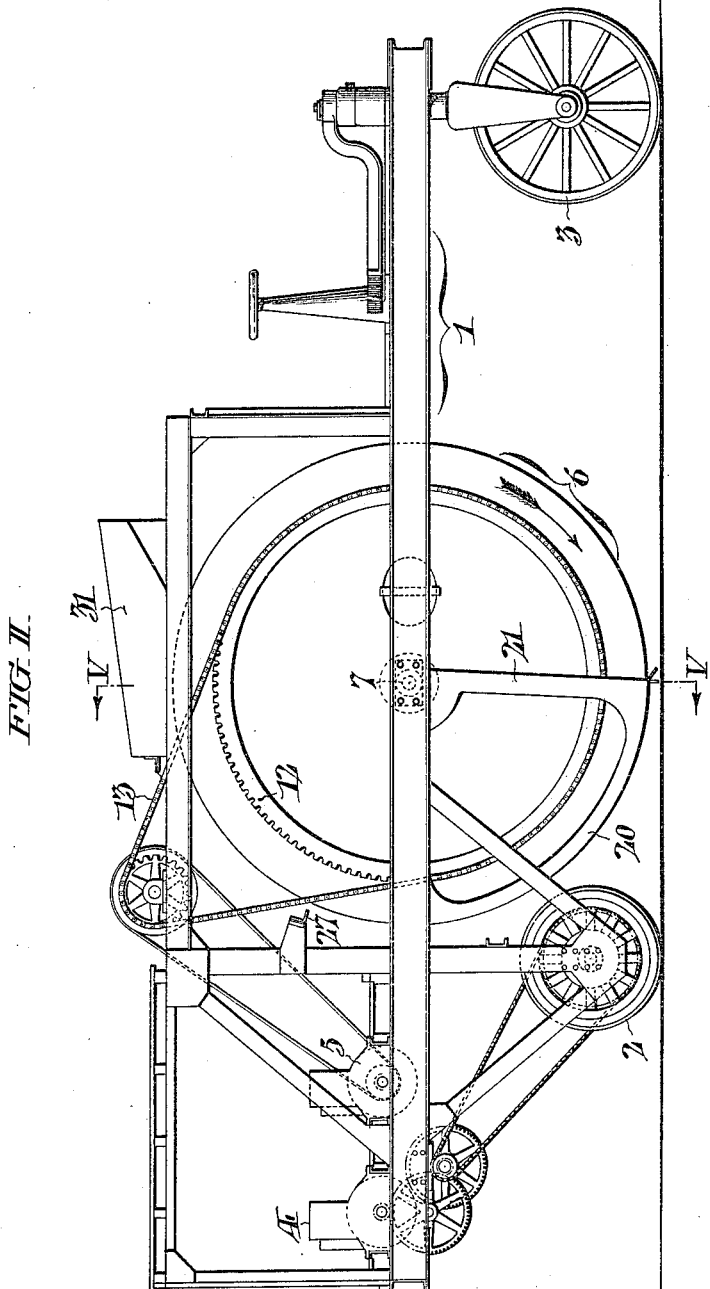

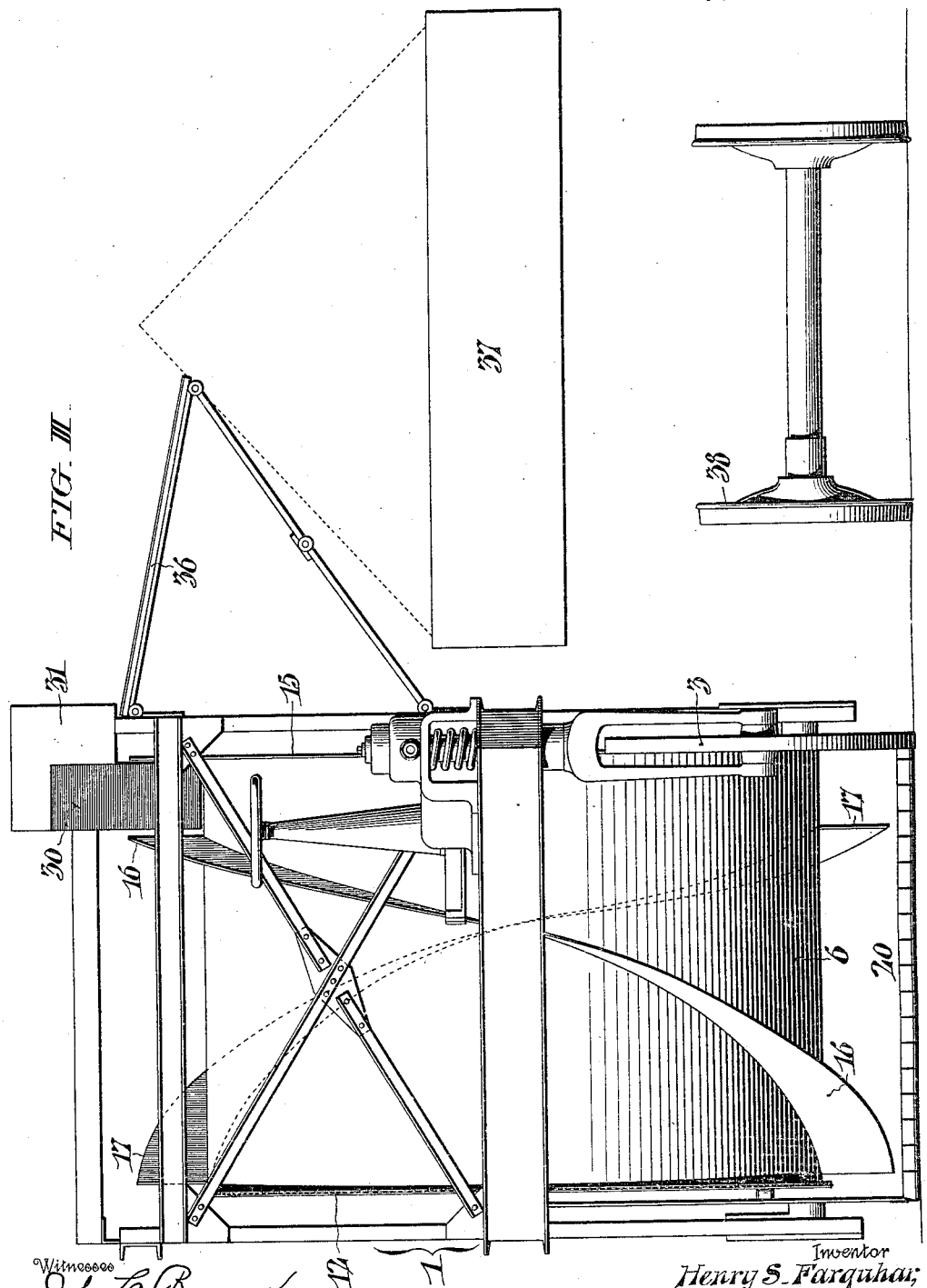

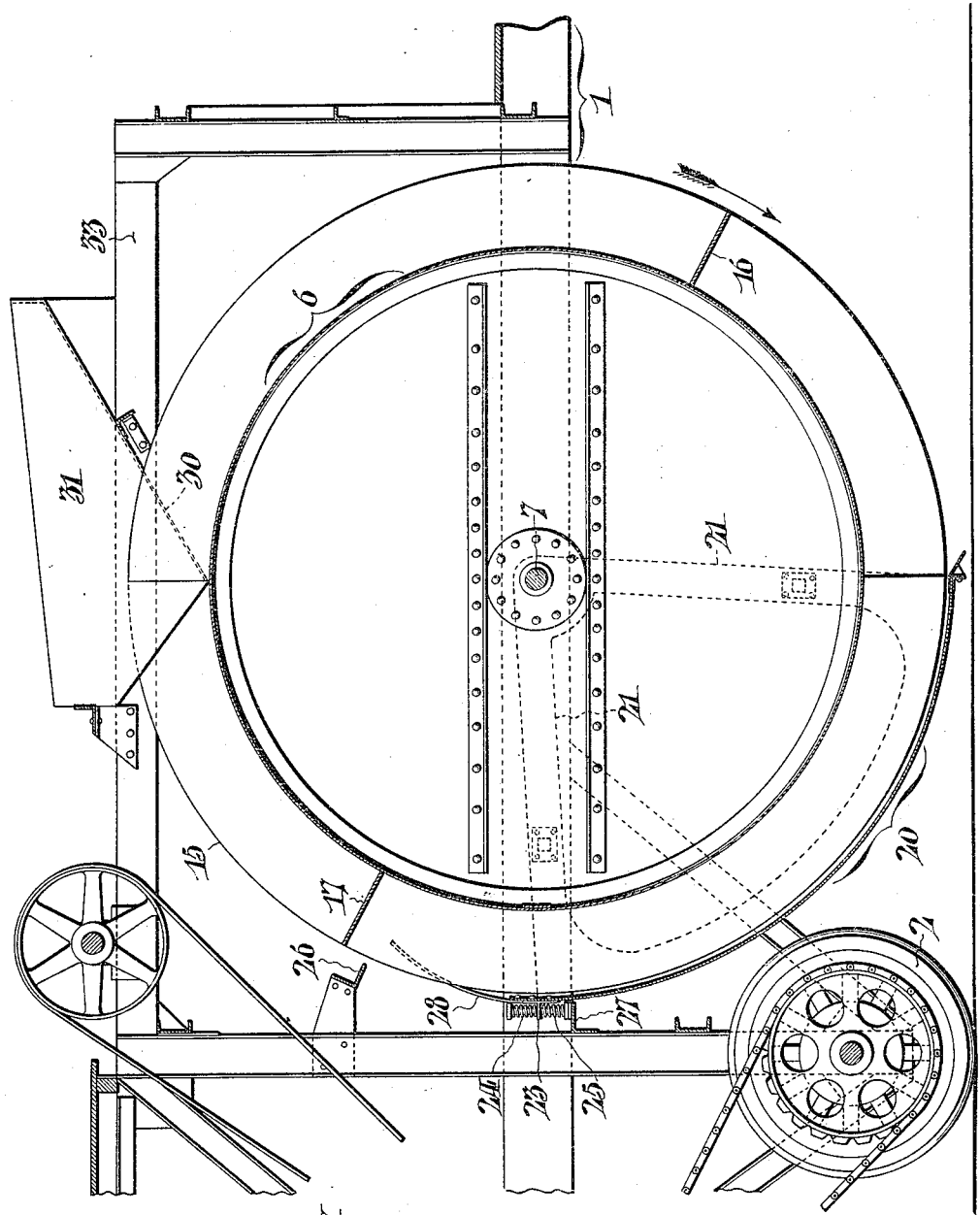

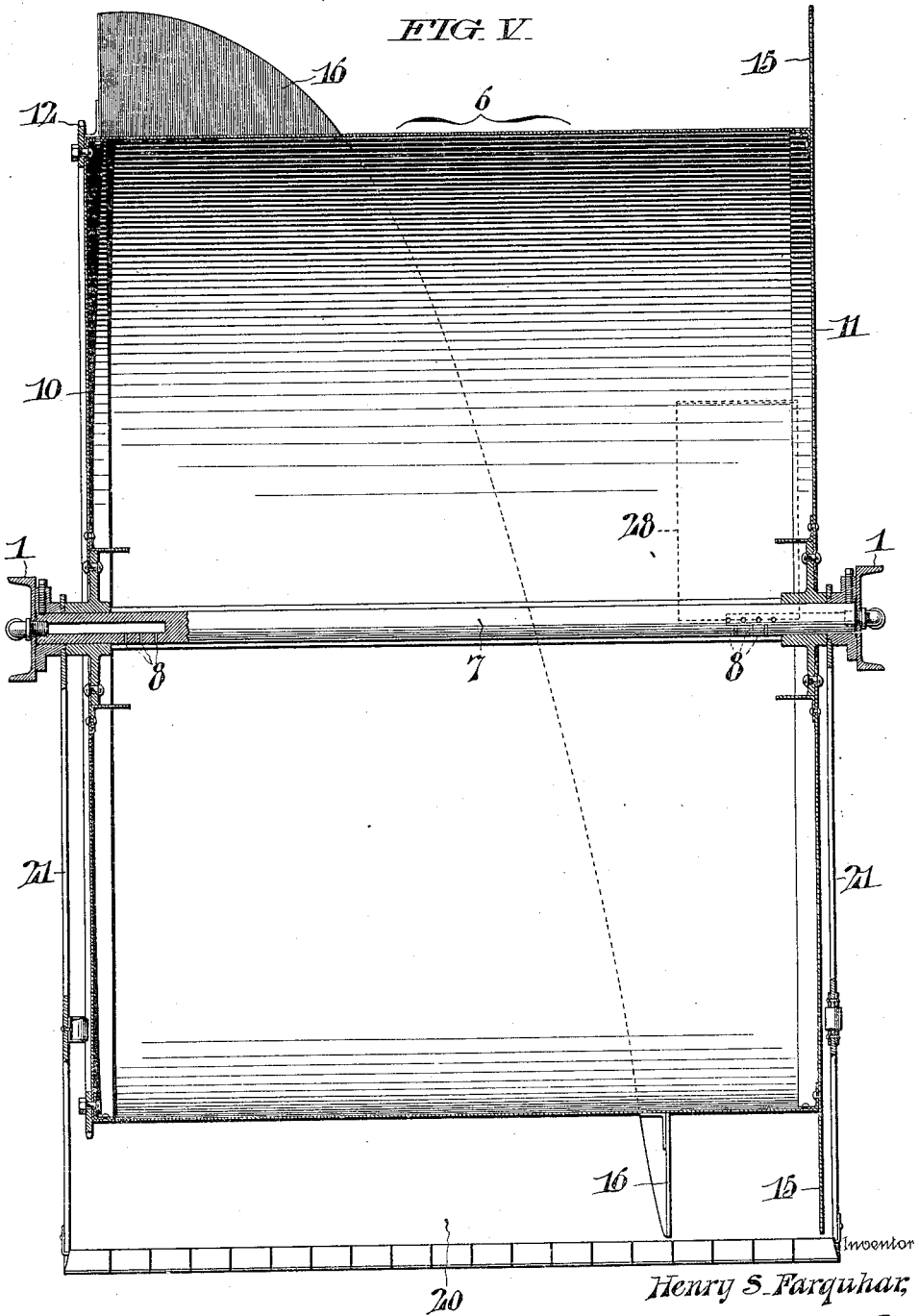

H. S. FARQUHAR.
MACHINE FOR REMOVING SNOW AND LIKE MATERIAL.
APPLICATION FILED OCT. 28, 1916.
1,272,786.
Patented July 16, 1918.
8 SHEETS—SHEET 6.
FIG. VI.
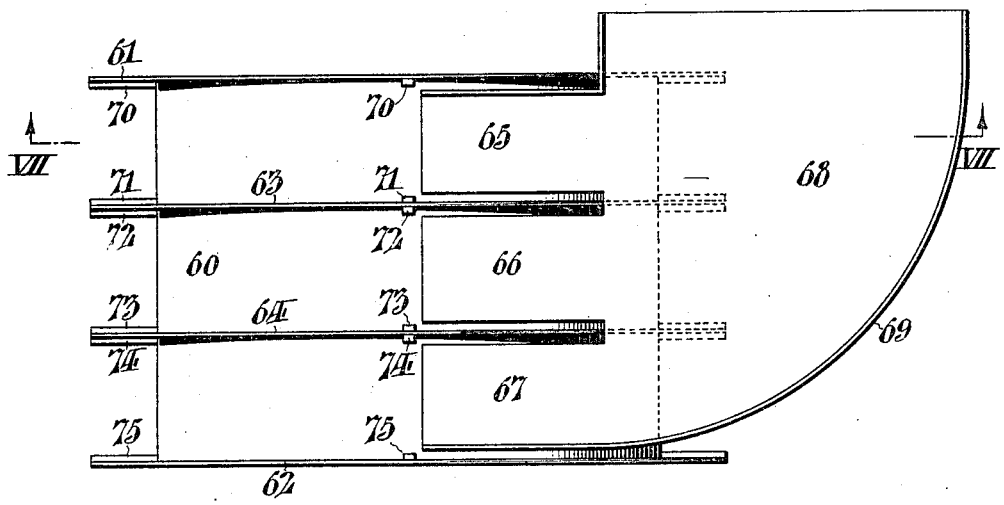
FIG. VII.
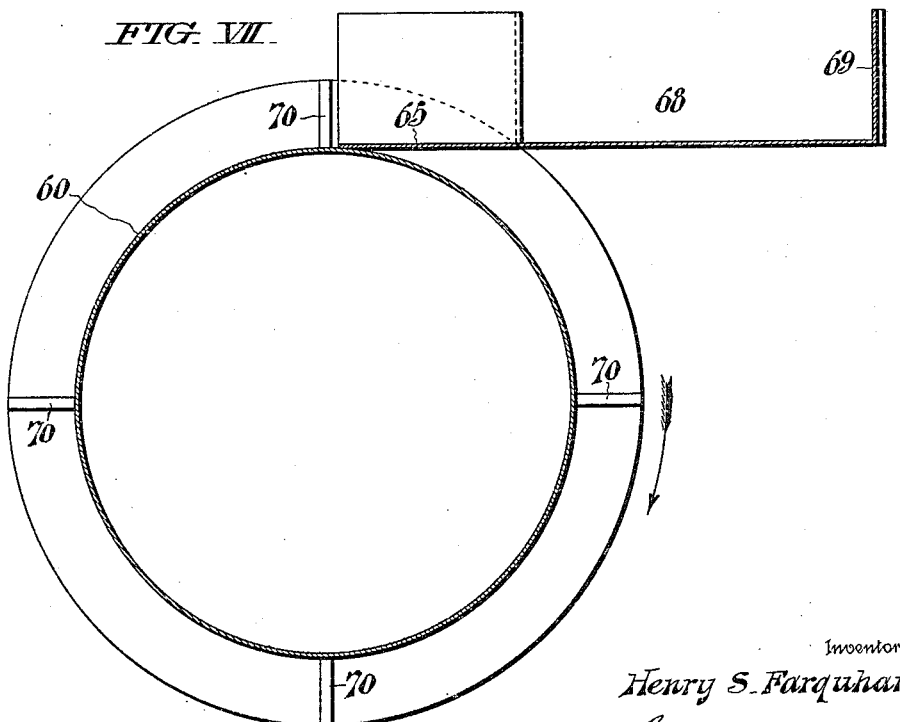
Inventor
Henry S. Farquhar,

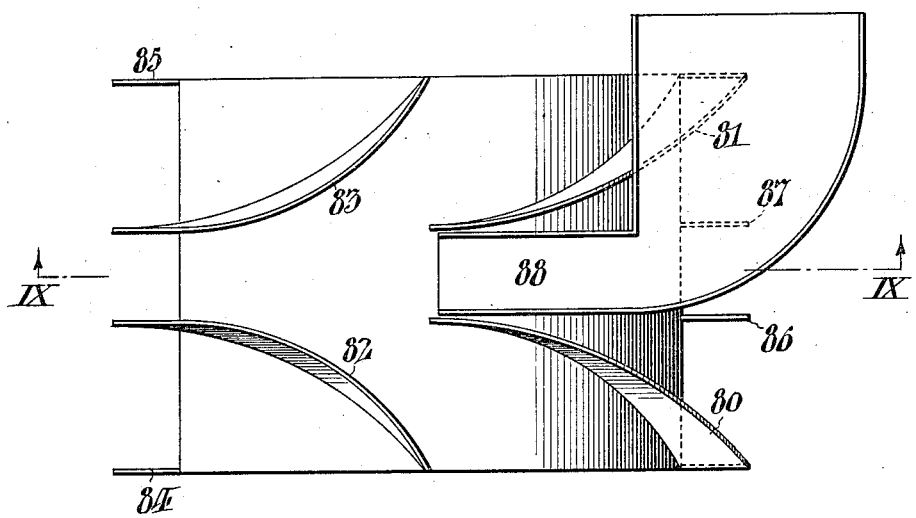
FIG. VIII.
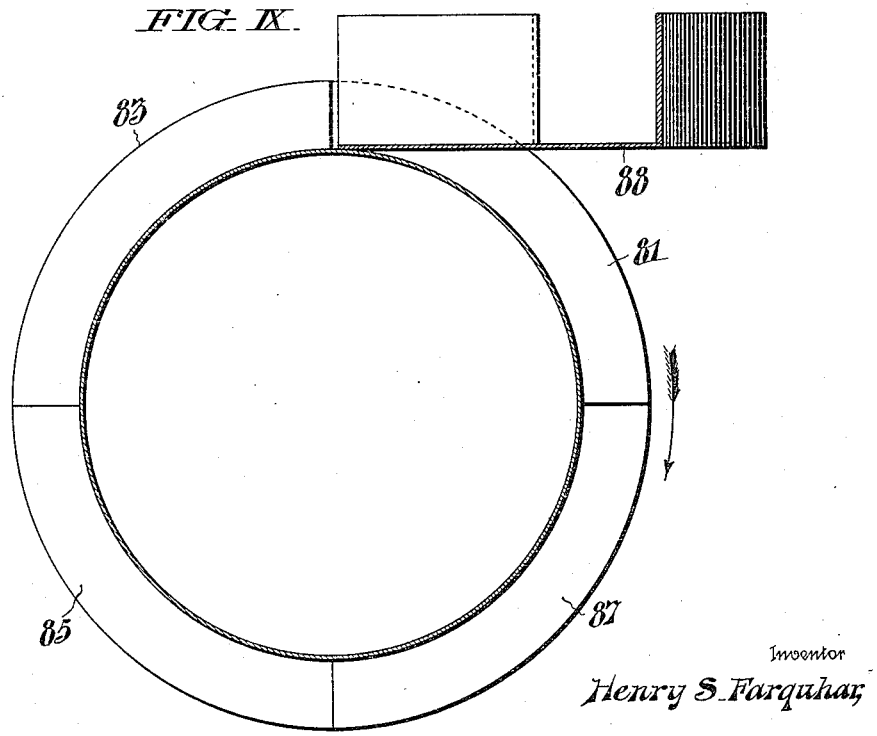
FIG. IX.

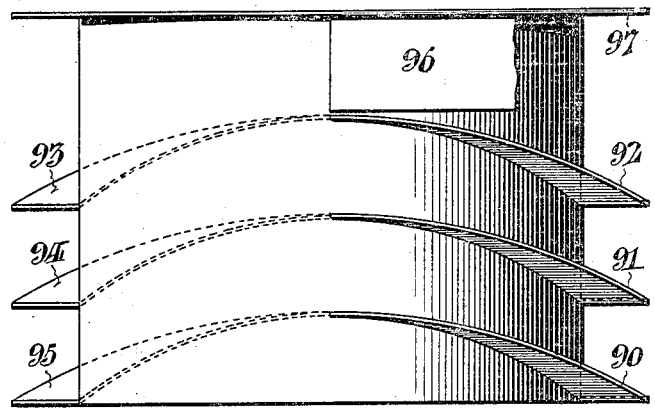
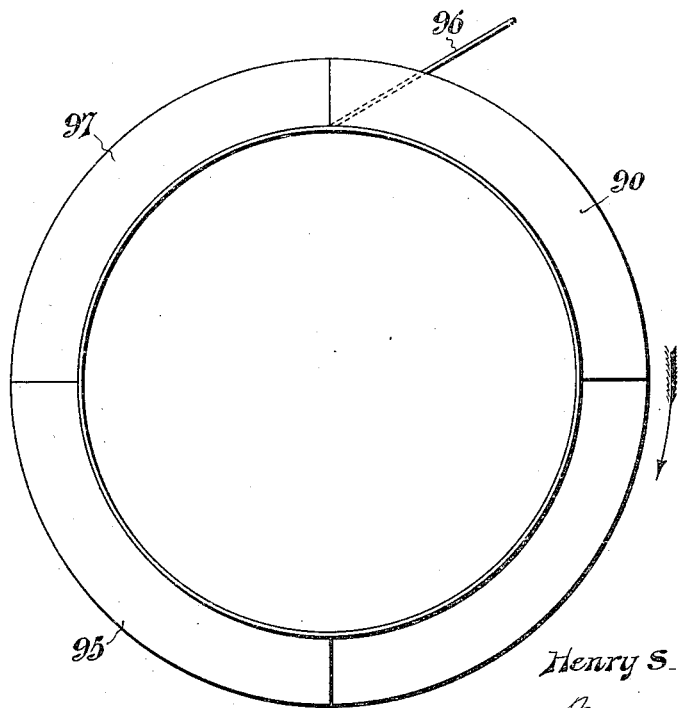

UNITED STATES PATENT OFFICE.

HENRY S. FARQUHAR, OF WAYNE, PENNSYLVANIA.

MACHINE FOR REMOVING SNOW AND LIKE MATERIAL.

1,272,786.  Specification of Letters Patent.  Patented July 16, 1918.

Application filed October 28, 1916. Serial No. 128,156.

*To all whom it may concern:*

Be it known that I, HENRY S. FARQUHAR, of Wayne, in the county of Delaware and State of Pennsylvania, have invented a certain new and useful Machine for Removing Snow and like Material, whereof the following is a specification, reference being had to the accompanying drawings.

Broadly speaking, it may be stated that the machine comprises a supporting frame or truck, mounted upon wheels, and capable of locomotion, preferably by means of an internal combustion engine carried upon said truck. The snow-removing devices proper comprise a positively rotated member, preferably a cylindrical drum of large diameter, whose periphery is provided with projecting walls forming deep channels, which are contracted at certain regions, in order that the snow accumulating therein shall be compacted to a degree which will cause it to choke within the channels and be held therein, insuring the retention of the choked snow throughout a portion of its travel, due to the action of the drum, and a discharge chute for the snow when it has reached the ultimate point of such travel.

In said drawings, Figure I, represents a top or plan view of the machine.

Fig. II, is a side elevation thereof.

Fig. III, is a front end elevation thereof, on an enlarged scale, showing diagrammatically the position of an adjacent vehicle into which the snow removed by my machine may be conveniently discharged for transportation.

Fig. IV, is a partial vertical longitudinal section on the line IV, IV, of Fig. I, and upon the same scale as Fig. III.

Fig. V, is a vertical section on the line V, V, of Fig. II, and upon a still larger scale.

Figs. VI, and VII, show respectively a partial top or plan view, and a partial vertical section on the line VII, VII, of Fig. VI, of an alternative arrangement of the drum and chute.

Figs. VIII, and IX, show respectively a partial plan view and a partial vertical section of another alternative arrangement of the drum and chute.

Figs. X, and XI, show respectively a partial top or plan view and a vertical section of another alternative arrangement of the drum and chute.

Referring to the type of apparatus illustrated in Figs. I, to V, both inclusive, 1, indicates comprehensively the supporting truck or frame provided with wheels 2, located near the rear extremity and a steering wheel 3, located near the front extremity and preferably arranged, as shown in Fig. I, in close proximity to one side of the truck. The truck preferably carries at its rear end an internal combustion engine, indicated comprehensively at 4, and connected through a speed-reducing train of gears and chain and sprocket system, with the driving wheels 2. As these devices are well understood, detailed description thereof is unnecessary. At or near its longitudinal center the truck carries a cylindrical metallic drum 6, rotatably mounted upon an axle 7, which may be hollow, as shown in Fig. V, and provided with openings 8, to admit a heating medium to the interior of the drum, if desired. The drum is closed at each extremity by heads 10, and 11, respectively, the former of which has its periphery provided with teeth 12, adapted to engage a sprocket chain 13, driven through a suitable train of gearing, etc., from a source of power, such as an internal combustion engine 5, which is preferably independent of the propulsion motor, so that the drum may be rotated at a definite rate of speed, irrespective of the rate of travel of the truck.

The other head 11, of the drum is extended radially so as to form a deep flange, or wall, as indicated at 15, which is of such radius with relation to the height of the axle 7, from the ground, as to approach quite closely to the surface from which the snow is to be removed.

The drum carries upon its periphery a projecting blade, or wall, spirally arranged and of a radial depth substantially corresponding to the extent of projection of the flange 15. In this instance two of such blades are shown, represented at 16, and 17, respectively, each one extending half way around the periphery and symmetrically situated with relation to the axis.

Referring to the sectional view of Fig. V, it will be noted that the blade 16, commences at a point close to the drum head upon the left hand side of the figure, (which corresponds to the side which is nearest the observer in the plan view of Fig. I), and that said blade is disposed in a spiral direction half way around the periphery as shown by the dotted lines, but terminates at a substantial distance, in an axial direction, from the flange 15. The other blade 17, is similarly disposed upon the other half of the periphery, as indicated in Fig. I.

It will thus be seen that each blade forms, in conjunction with the flange 15, a converging passageway, whose function will be described later on.

A curved scoop or apron 20, approximately corresponding in length to a quadrant of the peripheral flange 15, and of a width greater than the axial length of the drum, is freely suspended upon the axle 7, by means of arms or spoke 21, mounted, as shown in Fig. V, outside of the drum heads, so that said scoop may swing with relation to the axle throughout a small range, limited by stops, which coöperate with a spring buffer device (see Fig. IV), whereby said scoop is retained in the general position indicated, that is to say, its curved bottom incloses substantially the lower rear quadrant of the drum, considered with relation to the direction of travel of the machine. The details of the spring buffer device need not be further described than by stating that an outwardly projecting member 23, at the upper rear extremity of the scoop serves as an attachment for a compound buffer comprising two springs 24, and 25, respectively, adapted to engage with the transverse bars 26, and 27, carried by the truck frame. It will thus be seen that the scoop 20, coöperates with those portions of the periphery, of the drum, of the peripheral flange 15, and of the flight 16, or 17, which are, at any given period, subtended by it, so as to form a completely inclosed passage whose lateral walls, as before stated, converge. If desired, the scoop may be prolonged upwardly beyond the quadrant by means of a plate 28, (shown in Fig. IV, and in dotted lines in Fig. V), secured to the upper rear extremity and converging somewhat toward the periphery of the drum, so as to still further contract the passage at that region. The width of the plate 28, in the direction of the axis of the drum, is such that it occupies a space slightly less than the narrowest portion of the channel formed by the flange 15, and proximate end of the flight 16, or 17, and it is located close to the flange 15. Said plate, if employed, should be of spring steel, so as to be capable of yielding under pressure radially outward.

Above that portion of the drum's periphery which corresponds to the narrowest, extremity of the inclosed channels, is placed a delivery chute constructed and arranged as follows:

The bottom of the chute is formed of inclined plate 30, one end of which is arranged very close to the periphery of the drum, and whose width, in the direction of the axis of the drum, is such that it will fit snugly, but freely, within the narrowest portion of the channels. A side wall 31, of a depth considerably greater than the blade 16, or 17, is arranged along the side which is adjacent thereto. For convenient structural arrangement, the side wall 31, may be made straight and connected at one extremity of the chute with a transverse piece 32, mounted upon the raised frame 33, of the truck. Internally, however, the wall of the chute is curved as shown at 35, in Fig. I, so as to laterally divert the material which is caused to travel up the inclined bottom 30, and deliver said material upon a laterally projecting incline platform 36, carried at the side of the truck, and extending outward sufficiently far to afford a convenient point of discharge into an adjacent receptable 37, which, as diagrammatically indicated in Fig III may be the body of a platform car whose wheels 38, run upon a track parallel to the general course of travel of the machine.

The operation of the device in a typical instance is as follows: Assuming that it is employed upon a city street in which a railway track is located, and that the ordinary sweepers have removed the snow from the track proper and piled it up alongside thereof, the machine (accompanied by a receiving and transporting car upon said track) is caused to travel in a direction parallel to the track and along the ridge of snow, the front or steering wheel being outside of the base of the snow ridge, or near to the edge thereof. As the machine travels, the drum is positively rotated, say at a speed of some 40 revolutions per minute, in the direction of the arrows, and the blades 16, and 17, as they respectively cut into and engage the snow, shift it laterally toward the flange 15. As a consequence of this action, the snow is not only shifted, but is crowded toward the flange 15, until at some point in the contracted channel it will, so to speak, arc across, and owing to its impacted condition will resist further movement within the channel. It is characteristic of snow and like material that when it is forced into a passageway which is contracted, either gradually or suddenly, a critical point will be reached beyond which it is practically impossible to cause any further movement of the impacted mass in the direction toward which it has been carried to the choking point.

Hence, in my device, the snow which has thus become choked in the contracted passageway will, when the choking or wedging becomes sufficient to overcome the gravity and inertia of the snow, be carried bodily, by the rotation of the drum, through the region subtended by the scoop 20, which will insure the retention of the mass against displacement through the action of gravity, until it reaches the upper quadrant of rotation, through which it will be carried by the drum until it reaches the bottom 30, of the delivery chute. Since at this time the mass of impacted snow is no longer inclosed upon its outer surface, the inclined bottom 30, on engaging it, will plow it off, and by the progressive accumulation due to rotation of the drum, the impacted snow will be caused to travel up the incline and be diverted laterally by the curved side 35, of the chute, so as to be delivered upon the inclined platform 36, and thence discharged by gravity into the car 37. If the curved plate 28, be employed at the rear extremity of the scoop 20, a still further impacting of the outer surface of the choked snow will occur, and any tendency to fall backward during the period of rotation toward the chute 30, will be minimized. This, however, is an adjunctive device, and does not constitute an essential part of my invention. Owing to the free suspension of the scoop it can yield rearwardly and upwardly when any rigid obstacle is encountered, so as to ride upon the same and thereafter return to normal position.

In the modified forms of devices shown in Figs. VI, to XI, inclusive, the same general principle of operation prevails, but the details differ. Thus, in Figs. VI, to VII, the drum 60, is provided at both extremities with deep flanges 61, and 62, respectively, and carries upon its surface a plurality of walls 63, and 64, respectively, each of which is arranged in a plane at right angles to the axis of the drum, instead of following a spiral direction. Thus, a plurality of straight channels are formed side by side upon the drum. A corresponding plurality of delivery chutes 65, 66, and 67, leading to a common passageway 68, whose rear wall 69, is curved toward a point of lateral delivery, are arranged in operative relation to the periphery of the drum and walls of the respective channels. The walls 61, 62, 63, and 64, are provided with internally projecting radial ribs 70, 71, 72, 73, 74, and 75, preferably arranged in quadrant positions, as indicated in Fig. VII. These ribs constitute an abrupt contraction of the channel between the flanges, as distinguished from the gradual contraction by spiral convergence in the embodiment first described. The mode of operation of the device is, therefore, similar to that previously set forth in so far as refers to the crowding of the snow within the channel until it chokes, but in this instance, the operation lacks the feature of lateral transference of the collected snow by the channel walls, in a direction parallel to the axis of the drum.

In the form of the device shown in Figs. VIII, and IX, the drum is provided with a plurality of pairs of spirally arranged blades 80, 81, 82, 83, 84, 85, 86, and 87, each of a quadrant in extent and whose sides converge from each extremity of the drum toward a region extending across the longitudinal center thereof. The end flange of the drum is dispensed with, and the delivery chute 88, is arranged with its bottom at the central region, longitudinally, of the drum and between the extremities of the blades at their point of nearest approach to one another.

In Figs. X, and XI, the drum is shown as provided with a plurality of quadrant blades, such as are indicated at 90, 91, 92, 93, 94, and 95, each having a cutting edge at the extremity which is forward in the direction of movement of the drum. These blades are arranged in groups whose members are parallel to one another and hence tend to shift the snow laterally toward that end of the drum which is most remote from the observer in Fig. X, the contraction of the ultimate channel occurring at the region between the rear extremity of the end blade of the group (in this position the blade 92), and the projecting flange 97, of the drumhead. The inclined bottom 96, of the delivery chute is arranged adjacent to the flange 95, and between it and the nearest point of approach of the proximate blade.

The above described alternative arrangements of the channels carried by the drum illustrate, in a general way, the wide range of possible applications of the principle of my invention, which is based upon the fact that snow possesses the peculiar property of arching, or bridging, across a contracted passage or channel into which it is forced so that ultimately said channel will become choked by a compacted mass substantially immovable with relation to the walls of the channel in the direction in which the compacting has taken place. This property, when made available by a traveling member of the general character stated and relatively movable, permits the accumulation of a substantially extended body of snow so compacted as to be carried by the movement of said member without falling away, and which is ultimately elevated to a desired point, where the compacted mass may be discharged.

The action thus referred to should not be confused with that which occurs through mere adhesion of excavated material to a moving surface. For instance, snow can be made to choke in a channel of the character described, even though the surface of the channel be heated so as to minimize adhesion, and, on the other hand, sticky materials, such as clay or earth, will adhere under some circumstances to a moving surface and yet will not lend themselves to the peculiar choking action which is characteristic of the compression of relatively widely separated particles of snow, which appear to interlock and arch to the choking point when forced into a contracted passage.

In my claims hereafter made I shall, to avoid prolixity, refer to snow as the material to be acted upon, not as absolutely restricting the device to employment upon that particular substance, but a convenient designation for material having the above described peculiar property of snow, as distinguished from the mere capacity of adhering to a moving surface.

Having thus described my invention, I claim:

1. In a device for removing snow, the combination of a traveling support; a relatively movable member mounted thereon, said member being provided with projecting walls forming a channel adapted to engage and receive snow through the progressive movement of said member, said walls having convergences adapted to form a contracted region; means for moving the convergence of said walls toward a region of discharge; and means for removing the compacted snow when said region of discharge is reached, substantially as set forth.

2. In a device for removing snow, the combination of a traveling support; a rotatable drum mounted thereon; walls projecting from the periphery of the drum adapted to form a snow receiving channel; having convergences adapted to form a contracted region; means for rotating the drum; and a delivery chute extending substantially across the channel at the contracted region thereof, substantially as set forth.

3. In a device for removing snow, the combination of a traveling support; a rotatable drum mounted thereon; walls projecting from the periphery of the drum adapted to form a snow-receiving channel; having convergences adapted to form a contracted region; means for rotating the drum; a delivery chute extending substantially across the channel at the contracted region thereof; and a scoop having a periphery substantially concentric with the periphery of the channel walls, substantially as set forth.

4. In a device for removing snow, the combination of a traveling support; a rotatable drum carried by said support and provided with a deep peripheral flange at its extremity; a substantially spiral wall mounted upon the periphery of the drum and converging toward said peripheral flange; means for rotating the drum; a scoop having a periphery substantially concentric to that of the flange; means for retaining said scoop in a position subtending the rear quadrant of the drum, with relation to the direction of travel of the latter; and a chute entering between said peripheral flange and said wall at the region of their nearest approach to one another, substantially as set forth.

In testimony whereof, I have hereunto signed my name at Philadelphia, Pennsylvania, this twenty-fourth day of October, 1916.

HENRY S. FARQUHAR.

Witnesses:
JAMES H. BELL,
E. L. FULLERTON.

Copies of this patent may be obtained for five cents each, by addressing the "Commissioner of Patents, Washington, D. C."